United States Patent [19]
Hehl

[11] Patent Number: 4,680,570
[45] Date of Patent: Jul. 14, 1987

[54] LINEAR POTENTIOMETER FOR MEASURING TRAVEL

[76] Inventor: Karl Hehl, Arthur-Hehl-Strasse 32, D-7298 Lossburg 1, Fed. Rep. of Germany

[21] Appl. No.: 857,956

[22] Filed: May 1, 1986

[30] Foreign Application Priority Data

May 3, 1985 [DE] Fed. Rep. of Germany ....... 3115880
Oct. 5, 1985 [DE] Fed. Rep. of Germany ....... 3535587

[51] Int. Cl.$^4$ ............................................. H01C 10/38
[52] U.S. Cl. ..................... 338/176; 338/184; 338/199
[58] Field of Search ............... 338/176, 180, 183, 165, 338/188, 164, 184, 199

[56] References Cited

U.S. PATENT DOCUMENTS

| | | | |
|---|---|---|---|
| 3,588,779 | 6/1971 | Goerg | 338/183 |
| 3,639,880 | 2/1972 | Oka | 338/183 |
| 3,887,892 | 6/1975 | Rozema et al. | 338/183 |
| 3,996,550 | 12/1976 | Yano et al. | 338/176 X |

FOREIGN PATENT DOCUMENTS

2142129 1/1973 France.

OTHER PUBLICATIONS

Novotechnik KG, Offterdinger GmbH and Co., D-7302 Ostfildern, Federal Republic of Germany, (2 pages).

*Primary Examiner*—C. L. Albritton
*Attorney, Agent, or Firm*—Spencer & Frank

[57] ABSTRACT

A linear potentiometer, which is used for measuring the relative movement between component parts of a processing machine, particularly an injection molding machine, wherein the covering band of the linear potentiometer, which band covers a longitudinal slit in the upper surface of a tubular housing for a resistance element, is guided through the potentiometer slide per se by means of through openings with a slight upward curvature. As a result, the prerequisites are met that the entire potentiometer slide, including its guide ribs, its slide body and its anchoring plate for a joint, can be formed as an integral cast shaped part made of a high-polymer material. With this type of a slide embodiment, the accuracy of measurement can be kept at a sufficiently high level over long periods of time, even under conditions of extremely sever strains.

11 Claims, 11 Drawing Figures

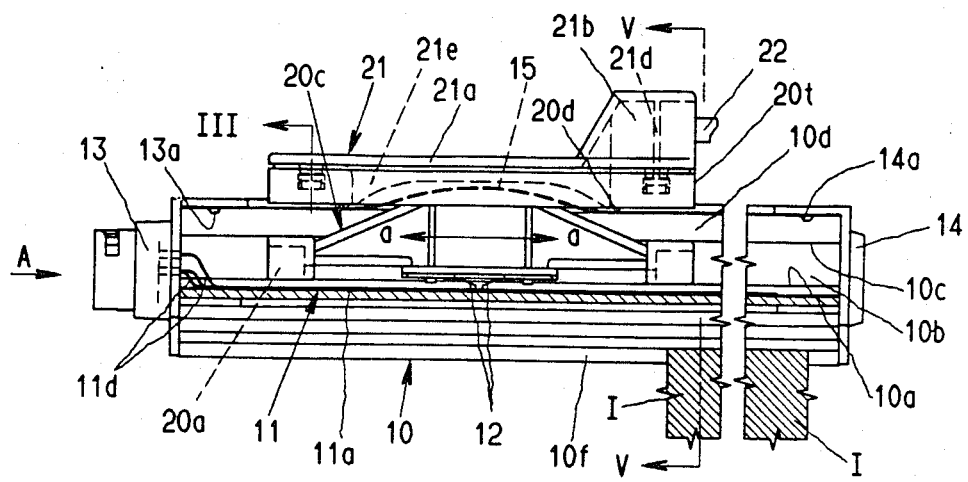
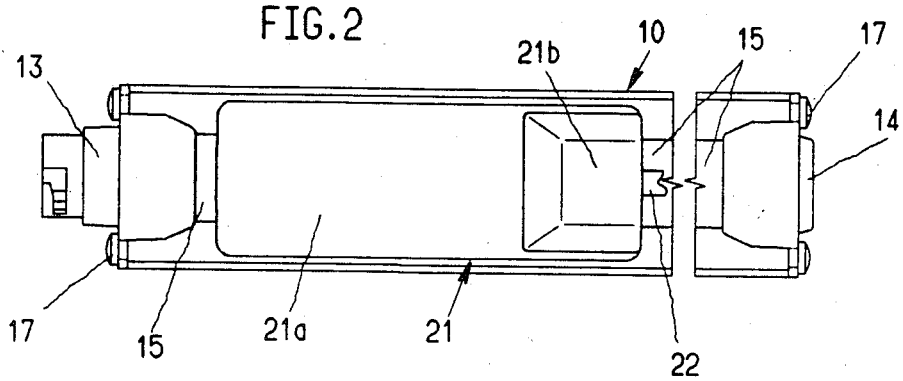
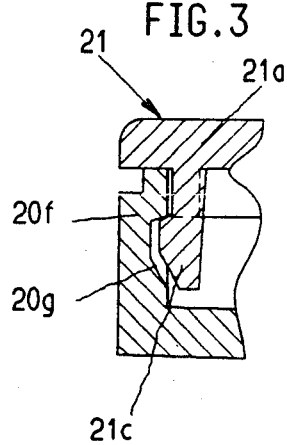
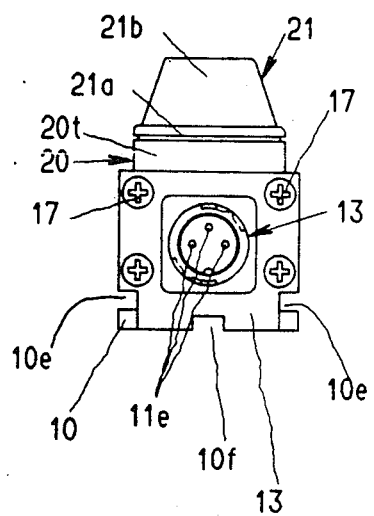

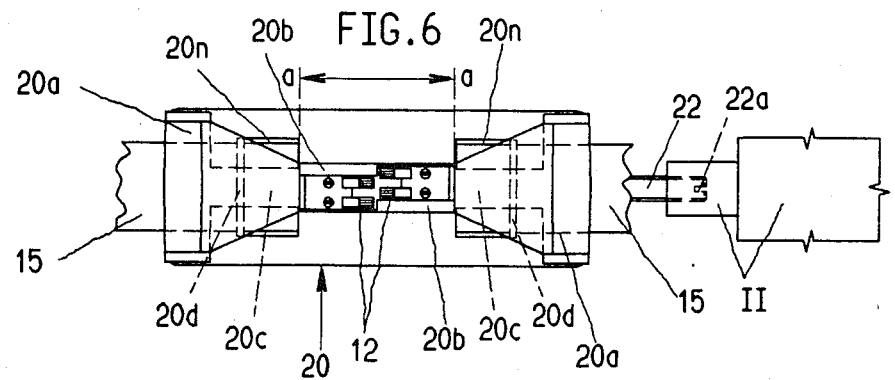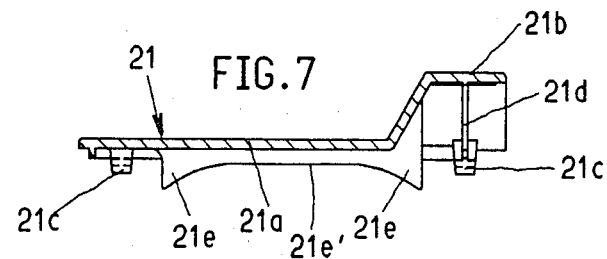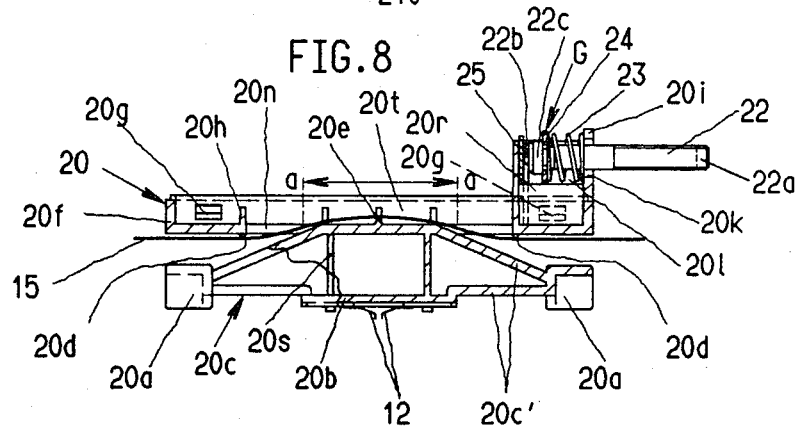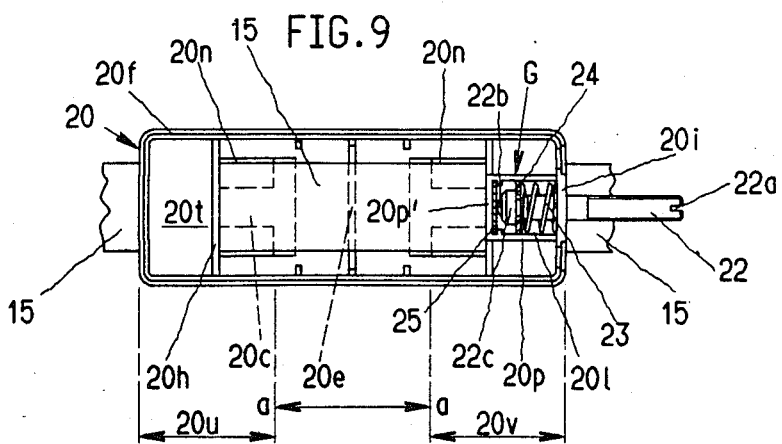

LINEAR POTENTIOMETER FOR MEASURING TRAVEL

BACKGROUND OF THE INVENTION

The present invention relates to a linear potentiometer for measuring travel and in particular the relative linear movement between two parts or components. More particularly, the present invention relates to a linear potentiometer for measuring travel, particularly for controlling the relative movement between two component parts of an injection molding machine, for example a plastic injection molding machine, which potentiometer is of the type including: a metal housing, which is securable to one of the component parts, for an elongated resistance element, with the housing having an elongated tubular shape of approximately rectangular cross section and a longitudinal slit, which is disposed symmetrically with respect to a vertical plane of symmetry, in its upper wall and above the resistance element; a covering band of spring steel which normally rests on the upper wall of the housing to cover the longitudinal slit, and is normally retained there with the aid of permanent magnets on the housing; and a slide which is connectable via a joint to the other component part and which carries a wiper for the resistance element, with the slide having a slide body portion whose lower end carries the wiper and is connected to a pair of horizontal spaced guide ribs slidably supported on guide shoulders formed in the interior of the housing and whose upper end, in its middle section, extends out of the longitudinal slit above the housing, an anchoring plate for the joint connected to the upper end of the slide body portion above the housing with the plate extending horizontally and crosswise to the vertical plane of symmetry, and an arrangement whereby a portion of the covering belt can ride over at least a part of the slide body and around the portion containing the wiper as the slide moves along the housing.

In conventional linear potentiometers of this type (for example, see advertising by Novo-Technik KG, Offterdinger GmbH & Co., Horbstrasse 12, D-7302 Ostifldern 1), the slide structure comprises the slide body, separate guide ribs, an anchoring plate for the joint and a separate, lid-like housing for the joint secured to the anchoring plate, as well as a special guide device for guiding the covering band in the slide. To avoid strains and excessive friction between the plastic guide ribs and their guide tacks, one of the two guide ribs is pivotably supported about a longitudinal axis of the metal slide body. With this kind of structure, the slide represents a relatively large mass, which must be rhythmically braked and accelerated when the linear potentiometer is in operation. Although such linear potentiometers are distinguished by high accuracy in measurement as well as by high wiper speeds, it has nevertheless been found that the precision of measurement drops when the linear potentiometer is subjected to extreme loads over relatively long periods of time. This is particularly the case when the structural components undergo severe vibration and when they are constrained relative movements, deviating from the slide axis, between the housing and the slide. It is also applicable, however, when shock and impacts are frequent, for instance because of improper handling, which can happen especially in the case of exports to industrially underdeveloped countries.

In the conventional linear potentiometers described, the prerequisite for satisfactory protection from dirt of the vulnerable wiper contacts in the housing is to construct the slide from a plurality of parts, some of them plastic and some for them metal. For example, covering of the longitudinal housing slit through which the slide body extends is achieved by providing that a metal bearing part for the slide joint, which part is disposed outside the housing, is screwed onto the anchoring plate of the slide, and that the covering band which covers the longitudinal slit is guided in between the screwed-together components. Moreover, embodying the guide ribs as separate plastic elements attached to the metal slide body, some of them in articulated fashion, is intended to assure strain-free sliding of these guide ribs in the guide shoulders of the housing. In this sense, the multiple-part, multiple-material structure of the known slide is dictated partly by assembly considerations and partly by considerations of function. Such a structure, however, leads to the above-mentioned restrictions in terms of measurement accuracy when there is intensive use over many years, in particular when there is additional strain in the form of shock and impact.

It is also known from French Patent No. 2,142,129, to construct a linear potentiometer such that it is completely dustproof and moistureproof. However, the linear potentiometer disclosed in this patent is not designed to measure the relative movement between two component parts of a processing machine, and accordingly it does not need any connection, effected via a link, between a slide disposed on one component part and the other component part. Thus there is no compelling reason for the slide to have a multiple-part structure. Nevertheless, in this linear potentiometer the portion of the slide located outside the housing and the portion of the slide disposed inside the housing are each embodied by separate molded part. Although these molded parts are firmly joined to one another, they still each have their own guide devices, which are guided at different levels in the housing.

SUMMARY OF THE INVENTION

Taking the above prior art as the point of departure, it is the object of the present invention to construct the slide for a linear potentiometer of the above described type having an elongated tubular metal housing with a rectangular cross section and a covering band made of spring steel for the longitudinal housing slit, such that the guide ribs, slide body, anchoring plate, the walls for the chamber housing the joint and the guide devices for guiding the covering band are embodied by a single molded plastic part produced by injection molding, so that the measurement accuracy can be maintained on a high level for long periods of time, even under the above-described unfavorable conditions.

The above object is attained in accordance with the present invention by a linear potentiometer for measuring the relative movement between two component parts of a machine, paticularly a plastic injection molding machine which comprises: an elongated housing in the form of a metal tubular profiled member of approximately rectangular cross section which is securable to one of the component parts, with the housing having a longitudinal slit disposed symmetrically with respect to a vertical plane of symmetry in its upper horizontal wall, a plurality of guide shoulders formed in the inner surface of each of its side walls, and a plurality of permanent magnets disposed on the upper surface of the upper wall adjacent the slit; a covering band of spring steel, which rests on the upper surface of the upper wall of the housing to cover the longitudinal slit and is normally retained there by the permanent magnets; a molded integral slide formed of a high polymer plastic and connectable via a joint to the other of the component part, with the slide being movable along the length of the housing and including a pair of spaced horizontal guide ribs slidably supported on the guide shoulders of the housing and connected together via a slide body portion which in turn has a middle section whose upper end extends through the longitudinal slit above the upper housing wall and there forms a horizontal anchoring plate which extends cross wise symmetrically to the vertical plane of symmetry, a joint chamber defined by a plurality of walls, at least one of which extends transverse to the plane of symmetry, molded onto the upper surface of the anchoring plate, and at least one opening for the covering band which extends through the anchoring plate and which is defined on one side by the at least the one wall of the chamber and on its opposite side by a region of the anchoring plate corresponding to the middle section of the slide body portion, so that the covering band extends through the opening and over the region of the anchoring plate; at least one wiper for a resistance element mounted on the lower end of the slide body portion; and an elongated resistance element disposed within the housing beneath the slit and the wiper.

In a linear potentiometer according to the invention as defined above, which reduces the weight of the slide by several times a compared with the slide of the linear potentiometer according to the prior art, a constancy in terms of the spatial relationships between the guide ribs and the slide body is assured by injection molding. Furthermore, the manufacturing steps required for assembling the slide in the linear potentiometer of the prior art, and the associated manufacturing tolerances and dimensional discrepancies, are obviated. This is particularly applicable to the constant spatial relationship between the chamber of the slide that houses the joint and the guide ribs of the slide, and hence of the housing guiding these guide ribs. Since this housing is made of metal, the plastic surfaces of the guide ribs slide on metal surfaces of the housing, which substantially facilitates and promotes the sliding of the slide.

Moreover, in the middle section of the slide body, securing surfaces for the wipers are molded onto the underside of the slide body, so that an insulating bearer plate for the wiper contacts which is required in linear potentiometers according to the prior art having metal slide bodies, can be dispensed with.

Finally, it should be noted that even a single through opening in the portion of the slide located outside the housing would suffice for the passage through it of the covering band, if the chamber for the joint were disposed in the middle section of the slide body, in the manner of a bridge above the anchoring plate, thereby forming this through opening.

BRIEF DESCRIPTION OF THE DRAWINGS

A preferred exemplary embodiment of the invention is shown in the drawings wherein:

FIG. 1 is a side view of the linear potentiometer according to the invention with the housing shown in longitudinal section;

FIG. 2 is a plan view of the linear potentiometer of FIG. 1;

FIG. 3 is a section taken along the line III of FIG. 1, on a larger scale;

FIG. 4 is a front view of the linear potentiometer with its plug device taken in the direction A of FIG. 1;

FIG. 6 is a bottom view of the slide of the linear potentiometer showing the wiper and the connection between the joint and one component;

FIG. 7 is a longitudinal sectional view of the cover of the slide;

FIG. 8 is a side view of the slide, partially in longitudinal section, showing the joint for the connection of the slide with one of the component parts;

FIG. 9 is a top plan view of the slide without its cover;

DETAILED DESCRIPTION OF THE PREFERRED EMBODIMENT

Figure 5:
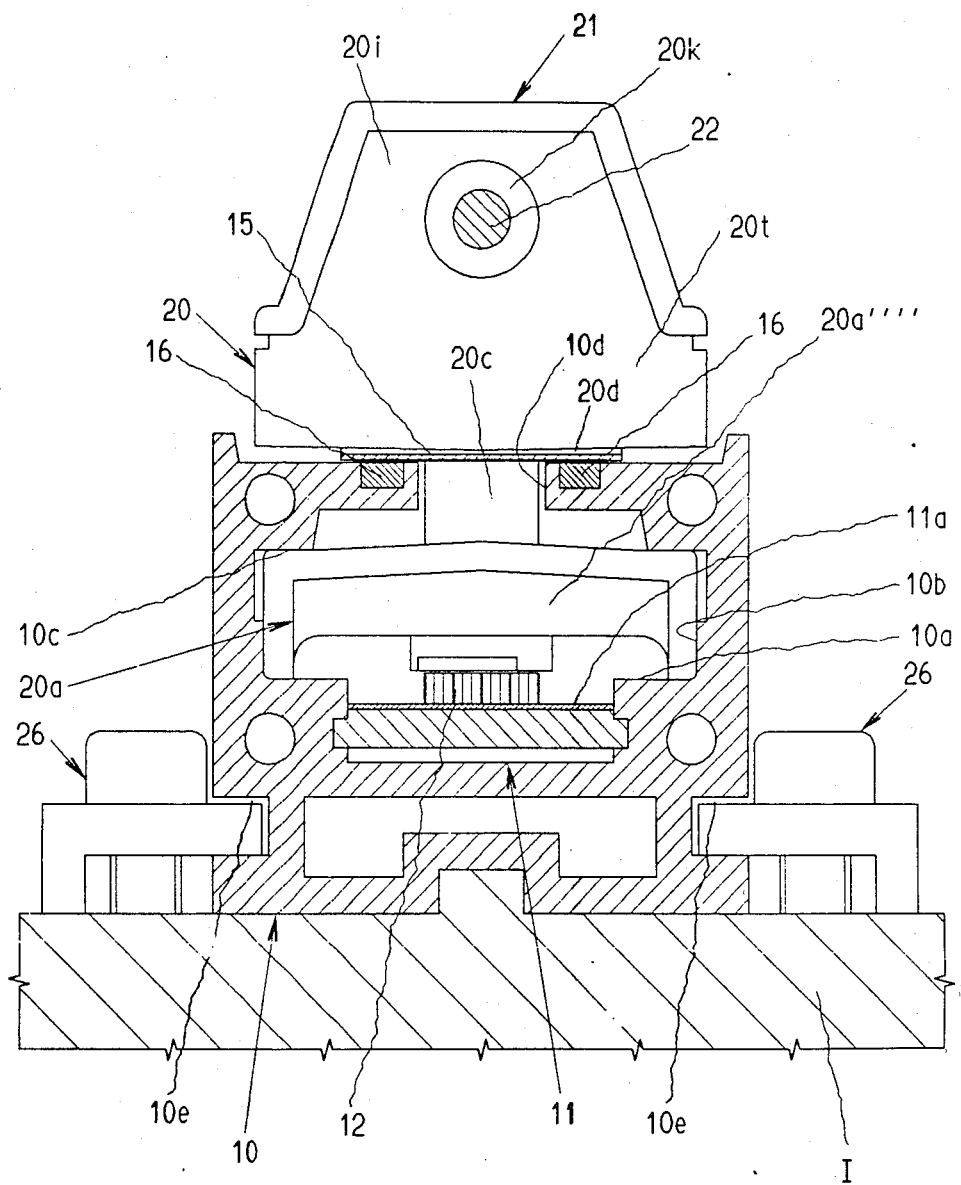
FIG. 5 is a section taken along the line V—V of FIG. 1, on a larger scale.

Referring now to the drawing figures, the linear potentiometer for measuring travel according to the invention is particularly suitable for controlling the relative movement between component parts of a processing machine, such as a plastic injection molding machine. In a conventional manner, the potentiometer generally includes an elongated housing 10 (only a portion of which is shown in the drawings) for a resistance and collector track substrate 11, wipers 12 mounted on a slide 20, and a slide cover 21. As shown, the elongated housing 10 is formed by a tubular profiled section of approximately rectangular cross section which is provided with longitudinal grooves 10e (FIG. 4) on its exterior surface for engagement by a securing device 26 (FIG. 5) which joins the housing 10 with the first component part I. The slide 20 for the wipers 12 (FIGS. 1, 6 and 8) which scan the voltage is joined via a link G (FIGS. 6, 8 and 9) with the other component part II. The scanning surface 11a, containing the resistor track and collector track which are scanned by the wipers 12 is disposed on a band-like substrate 11, mounted within the housing 10 along its bottom surface as is particularly visible in FIGS. 1 and 5.

Figure 11:
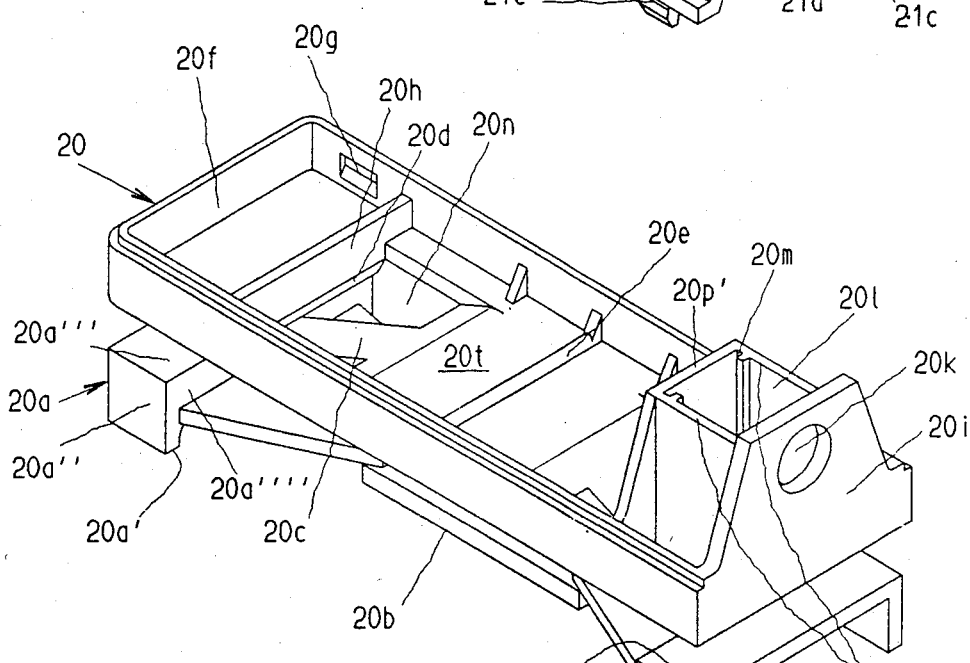
FIG. 11 is a highly enlarged perspective view of the slide.

The slide 20 is supported within the housing 20 by means of a pair of horizontal, spaced-apart guide ribs 20a such that it is slidable on an inner guide track having guide shoulders 10a, 10b, 10c formed in the inner surface of the housing 10 (FIG. 5). The guide ribs 20a are joined or connected together by a slide body portion 20c whose upper end, with its middle region or section a—a, extends through a central longitudinal slit 10d formed in the upper wall of the housing 10. This region a—a will hereinafter be called the penetration region. As best seen in FIGS. 5 and 11, the guide ribs 20a each have a U-shaped cross-section with lower and upper horizontal guide surfaces 20a' and 20a''' and a vertical guide surface 20a'' which slide on the respective inner guide surfaces 10a, 10c and 10b of the housing 10. Above the penetration region a—a, the slide body portion 20c, which is trapezoidal in side view, widens cross-wise to the direction of slide travel into an anchoring plate 20t for the joint G. The longitudinal slit 10d is covered with the aid of a covering band 15 of spring steel, which is normally retained in place by magnetic strips 16 disposed in the upper wall of the housing 10

(FIG. 5). The anchoring plate 20t extends partially underneath the covering band 15 and raises it slightly away from the strips 16. The guide ribs 20a, the slide body portion 20c and the anchoring plate 20t are formed by means of a single cast shaped part made of high-polymer plastic material, e.g. by injection molding.

In the sliding direction, the anchoring plate 20t is extended beyond the penetration region a—a and is provided, in its extended portions 20u and 20v, with respective through openings 20n for the covering band 15, as shown, e.g. in FIGS. 8, 9 and 11. The extended portions 20u and 20v each preferably extend as far as the vicinity of the underlying guide ribs 20a. The outer surface of the extended horizontal anchoring plate 20t is provided with a continuous vertical reinforcing rim 20f along its perimeter. The free end of one extended portion 20v is provided on its upper surface with opposed pairs of parallel walls 20p and 20i–20p' which define a chamber 20l for the joint G. These walls 20i, 20p, 20p' extend upward beyond the reinforcing rim 20f of the anchoring plate 20t. The end-surface wall 20i is part of the end-surface portion of the reinforcing rim 20f and as shown preferably is located in the same vertical plane as the outer or end edge of the underlying guide rib 20a.

As can be seen in FIGS. 6, 8, 9 and 11 the opening 20n formed in the anchoring plate 20 in the extended portion 20v is defined at one end by the inner or rear wall 20p' of the chamber 20l and on its other end by one edge of the section a—a of the anchor plate 20t. On the other hand, the opening 20n in the extended portion 20v is defined by the other edge of the section a—a of the anchor plate 20t and a transversely or cross wise extending reinforcing rib 20h formed on the anchor plate 20t. The width of the opening 20n corresponds essentially to the width of the covering band 15 so that the longitudinally extending edges of the openings 20n form guide surfaces for the edges of the covering band 15. As shown a cross-wise extending sliding rib 20e for the covering band 15 is provided in the center of the upper surface of the anchoring plate 20t and, if desired, respective downwardly extending sliding ribs 20d for the covering band 15 may be provided at the respective bottoms of the wall 20i and of the reinforcing rib 20h.

The inner surface of the rear chamber wall 20p', which is parallel to the chamber wall 20i, is reinforced with a hardened contact or joint plate 25 (FIGS. 8 and 9), e.g., of metal. As can be seen in FIG. 9, the joint plate 25 is insertable into and retained in its working position adjacent the inner surface of chamber wall 20p' by means of vertical guide grooves 20m (FIG. 11) formed on the vertical chamber walls 20p. Resting on the joint plate 25 is the end 22b of a connecting bolt or rod 22. As can be seen in FIGS. 8 and 9, end 22b is embodied as a spherical segment. The connecting bolt 22 extends with play through a bore 22k in the chamber wall 20i (FIGS. 4, 8 and 11) and is axially loaded by a helical spring 23. The helical spring disposed between the inner surface of the chamber wall 20i and a support disk 24 which itself is supported by a radial flange 22c of the rod 22. The connecting rod 22, whose end opposite the end 22b has an outer thread and a slit 22a for engagement by a screwdriver, extends with play through the helical spring 23 and the support disk 24. Because the end 22b is in the form of a spherical segment, the joint 22-25 has the nature of a ball joint. Moreover, relative movements between the connecting rod 22 and the slide 20 in a radial plane are also possible, because the inner diameters of the helical spring 23 and of the bore in the support disk 24 are substantially larger than the diameter of the connecting rod 22, and the plane surface of the joint plate 25 rests displaceably on the spherical-segmental end 22b. The support disk 24 and thus indirectly the helical spring 23 are supported on a horizontal longitudinally extending (FIG. 8) rib 20r formed on the bottom surface of chamber 20l.

The wipers 12 for the potentiometer are disposed on a horizontal securing surface 20b (see FIGS. 8 and 11) formed on the lower end of the slide body portion 20c. The resistance and collector elements on the scanning face 11a of the substrate 11 are connected via electrical connections 11d (FIG. 1) to the plug connections 11e (FIG. 4) of the plug device of an end piece 13. The end piece 13 closes off one end of the housing 10 and is provided with a retaining protrusion 13a which extends through an opening (not shown) in the covering band 15 to secure same against longitudinal movement. The opposite end of the housing 10 is covered by means of an end piece 14 which is likewise provided with a retaining protrusion 14a to secure the other end of the covering band 15. The end pieces 13, 14 are joined to the housing 10 by means of securing screws 17.

Figure 10:
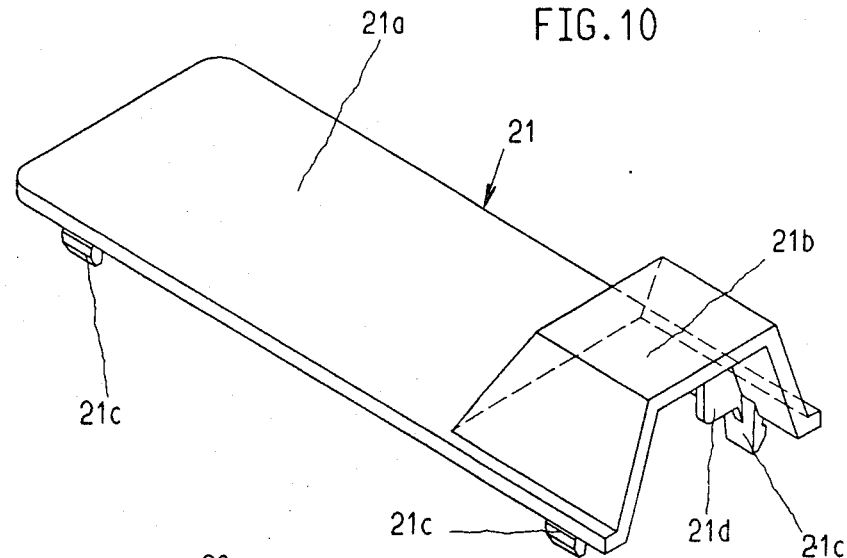
FIG. 10 is a highly enlarged perspective view of the cover of the slide.

The anchoring plate 20t is covered with a cover 21, which includes a roof or hood-like region 21b which covers the chamber 20l and whose outer end mates with the chamber wall 20i, and a platform-like region 21a which covers the remainder of the anchoring plate 20t. The cover 21 can be connected to the reinforcing rim 20f of the slide 20 by means of elastic tongues 21c which can lock into place in indentations 20g formed in the inner surface of reinforcing rim 20f, as particularly shown in FIG. 3. The cover 21 is centerable on the slide 20 by means of transversely extending support ribs 21d (FIGS. 1, 7 and 10) which are formed on the opposed inner surfaces of the portion 21b and which engage the outer surfaces of the sidewalls 20p defining the chamber 20l. This cover 21 has no functional significance in terms of travel measurement.

The support disk 20 is largely fixed within the chamber 20l. As indicated above, the joint plate 25, the support disk 24 and the helical spring 23 therefore form one movement unit, which is radially movable with respect to the connecting rod 22, that is, with respect to the component part II.

As shown in FIGS. 1 and 5, the bottom outer surface of the housing 10 is provided with a centering groove 10f into which extends a centering rib of the component part I in order to center the housing 10. When relative movements between the connecting rod 22 and the slide 20 which extend transverse to the direction of movement of the slide take place, this therefore causes sliding movements between the support disk 24 and the radial flange 22c as well as between the spherical-segmental end 22b of the connecting rod 22 and the joint plate 25.

As shown particularly in FIGS. 1, 6 and 9, the slide body portion 20c is a vertical plate with a trapezoidal shape whose upper end merges into the bottom surface of the anchoring plate 20t and whose remaining periphery is provided with a transversely extending reinforcing rim 20c'. In the center of the lower edge of the plate 20c, this reinforcing rim 20c' forms the rectangular shaped securing surface 20b for the wipers 12. Along the remainder of the lower edge of slide body portion 20c, the reinforcing rim 20c' is widened increasingly, beginning at both edges of the securing surface 20b, in the longitudinal direction of the slide 20 until substantially attaining the width of the respective guide ribs 20a connected to the ends of the slide body portion 20c. The outline of each of these widened portions of the reinforcing rim 20c' between the securing surface 20b and the respective guide ribs 20a corresponds generally to the basic geometrical shape of a trapezoid. The guide ribs 20a which, as indicated above, have a U-shaped cross section, are additionally provided within an inner vertical reinforcing wall 20a'''', into which the widened portion of the reinforcing rim 20c' extends, as shown particularly clearly in FIG. 11. Preferably, as shown, the maximum width of the widened portion of the reinforcing rim 20c' corresponds to the spacing between the inner surfaces of the vertical walls of the guide ribs 20a. Additionally, as shown in FIG. 8, the slide body portion 20c preferably is provided with vertically extending reinforcing ribs 20s on both of its surfaces in the region above the securing plate 20b.

As particularly seen in FIG. 7, a guide rib 21e for the covering band 15 is molded onto the underside of the cover 21 in its plane of symmetry extending parallel to the longitudinal slit 10d of the housing 10. The lower end of the rib 21e forms an upper guide edge 21e' for the band 15 and has a horizontal middle section and circular arc-shaped end sections. The guide rib 21e extends along the entire length of the two through openings 20n and the arc-shaped end sections extend into and preferably through the respective openings 20n. By means of the guide rib 21e, not only is a reinforcement of the cover 21 attained, but moreover a further economy in terms of material and a further reduction in weight of the cover 21 is achieved as a consequence of the slimming down of the cover. Additionally, the guide rib 21e results in the assembly of the linear potentiometer being made substantially easier because the covering band 15, which during assembly is introduced between the anchoring plate 20t and the surface of the housing 10, is fed into one of the openings 20n, e.g. the opening in extended portion 20v, whereupon it is guided by the supporting rib 21e around the center portion of the anchoring plate 20t and through the other opening 20n. Below the extended portion 20u of the anchoring plate 20t, the covering band 15 then comes to rest again on the surface of the housing 10.

The integration of all the essential functions of the slide 20 into a single cast shaped part, including the guide ribs 20a, the slide body portion 20c and the anchoring plate 20t for the joint G, is made possible by the fact that the covering band or strip 15 is guided through the shaped part via at least one through opening 20n by means of guide devices. Since upon each measurement, that is, upon each relative movement between the component parts of for example an injection molding machine, the mass of the slide 20 must be braked down to zero and then accelerated again afterward, the joint G undergoes much gentler treatment because of the reduction in weight of the slide 20, especially when measurements are performed in each injection cycle, or in other words are performed in millions of processing cycles.

It will be understood that the above description of the present invention is susceptible to various modifications, changes and adaptations, and the same are intended to be comprehended within the meaning and range of equivalents of the appended claims.

What is claimed is:

1. A linear potentiometer for measuring the relative movement between two component parts comprising in combination:

an elongated housing in the form of a metal tubular profiled member of approximately rectangular cross section which is securable to one of the component parts, said housing having a longitudinal slit disposed symmetrically with respect to a vertical plane of symmetry in its upper horizontal wall, a plurality of guide shoulders formed in the inner surface of each of its side walls, and a plurality of permanent magnets disposed on the upper surface of said upper wall adjacent said slit;

a covering band of spring steel, which rests on said upper surface of said upper wall of said housing to cover said longitudinal slit and is normally retained there by said permanent magnets;

a molded integral slide formed of a high polymer plastic and connectable via a joint to the other of the component parts, said slide being movable along the length of said housing and including a pair of spaced horizontal guide ribs slidably supported on said guide shoulders of said housing and connected together via a slide body portion having a middle section whose upper end extends through said longitudinal slit and above said upper wall and there forms a horizontal anchoring plate which extends cross wise symmetrically to said vertical plane of symmetry, a joint chamber defined by a plurality of vertical walls, at least one of which extends transverse to said plane of symmetry, molded onto the upper surface of said anchoring plate, and at least one opening for said covering band extending through said anchoring plate with said opening being defined on one side by said one wall of said chamber and on its opposite side by a region of said anchoring plate corresponding to said middle section of said slide body portion, said covering band extending through said opening and over said region of said anchoring plate;

a wiper for a resistance element mounted on the lower end of said slide body portion beneath said region of said anchoring plate; and an elongated resistance element disposed within said housing beneath said slit and said wiper.

2. A linear potentiometer as defined by claim 1, wherein: said anchoring plate has first and second extended portions which extend in the sliding direction of said slide from both ends of said region; and a respective said opening for the covering band is provided in each of said extended portions, whereby said covering band extends upwardly through one of said openings, over said region of said anchoring plate and downwardly through the other of said openings.

3. A linear potentiometer as defined by claim 2, wherein: said first and second extended portions of said anchoring plate each extends as far as the vicinity of the underlying one of said guide ribs; a vertical upwardly extending continuous reinforcing rim is provided along the periphery of said anchoring plate; and said walls defining said chamber are molded onto the free end of one of said extended portions.

4. A linear potentiometer as defined by claim 3, wherein: said vertical walls of said chamber protrude vertically upward beyond said vertical reinforcing rim and form a rectangular chamber; said at least one chamber wall is the rear wall of said chamber; a hardened contact plate is disposed against the inner surface of said rear chamber wall and is retained there by means of vertical guide grooves formed in opposed longitudinally extending ones of said chamber walls; and said joint includes a connecting bolt which extends with play through an opening in the one of said chamber walls opposite said rear wall and which has one end, which is disposed in said chamber, in the shape of a spherical segment, and a biased spring disposed in said chamber and urging said one end against said hardened contact plate.

5. A linear potentiometer as defined by claim 4, wherein: said connecting bolt has a radial flange adjacent said one end; a support disk is disposed on said connecting bolt so that it surrounds said bolt with play and is longitudinally supported by said radial flange; said spring is a helical spring which is mounted on said bolt and is compressed between said support disk and the inner surface in said one of said chamber walls opposite said rear wall; and the outer periphery of said support disk is seated on a horizontal longitudinally extending rib formed on the portion of said anchoring plate forming the bottom surface of said chamber.

6. A linear potentiometer as defined in claim 4 wherein said one of said chamber walls opposite said rear wall is an extension of said reinforcing rib and is located in a common vertical plane with the outer edge of the underlying one of said guide ribs.

7. A linear potentiometer as defined in claim 3 wherein said slide body portion is formed by a vertical plate having a trapezoidal shape which is provided with a laterally extending reinforcing rim about its periphery; and wherein the portion of said laterally extending reinforcing rim which extends along the bottom edge of said trapezoidal shaped plate forms a securing surface for said wiper in the center of said bottom edge and then, beginning at both ends of said securing surface, widens in the longitudinal direction of said slide to match the width of the respective said guide ribs.

8. A linear potentiometer as defined in claim 3 wherein said anchoring plate, is provided with a flat cover having a roof-like region at one end for covering said chamber, a plurality of tongues disposed about the periphery of said cover and engageable in indentations formed in the inner surface of said reinforcing rim of said anchoring plate for connection of said cover to said anchoring plate; and a pair of support ribs extending transversely from respective opposite inner surfaces of said roof-like region of said cover and engaging respective ones of said chamber walls to center said cover on said support plate.

9. A linear potentiometer as defined by claim 8, wherein: a guide rib for said covering band is molded onto the underside of said cover in said vertical plane of symmetry, said guide rib extending longitudinally between the outer edges defining said openings in said anchoring plate and having a lower guide edge having a middle horizontal portion and circular-arc-like end portions which extend downwardly into respective said openings when said cover is connected to said anchoring plate; and a sliding rib for said covering band is molded onto the middle of the upper surface of said anchoring plate and extends transversely to the direction of travel of said slide.

10. A linear potentiometer as defined by claim 7 wherein: said guide ribs each have a U-shaped cross section and are provided with a vertical reinforcing wall located cross wise to the direction of travel of said slide; and said widened portions of said reinforcing rim of said slide body portion extends into the respective said vertical reinforcing walls of said guide ribs.

11. A linear potentiometer as defined in claim 1 wherein said component parts are two relatively movable parts of a plastic injection molding machine.

* * * * *